(12) United States Patent
Stevenson

(10) Patent No.: US 7,086,976 B2
(45) Date of Patent: Aug. 8, 2006

(54) ELECTRIC MOTOR APPLIED CLUTCH WITH A DRAG TORQUE ACTUATOR

(75) Inventor: Paul D. Stevenson, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 132 days.

(21) Appl. No.: 10/819,410

(22) Filed: Apr. 7, 2004

(65) Prior Publication Data

US 2005/0227802 A1 Oct. 13, 2005

(51) Int. Cl.
*F16H 3/72* (2006.01)
*F16H 37/06* (2006.01)
*F16D 19/00* (2006.01)
*F16D 27/00* (2006.01)
*F16D 37/02* (2006.01)

(52) U.S. Cl. .............................. 475/2; 475/8; 192/48.2; 192/84.6

(58) Field of Classification Search .................. 475/4, 475/5, 8, 2; 192/48.2, 84.1, 84.6
See application file for complete search history.

(56) References Cited

U.S. PATENT DOCUMENTS

| | | | |
|---|---|---|---|
| 5,024,638 A * | 6/1991 | Sakakibara et al. | 475/210 |
| 5,482,512 A * | 1/1996 | Stevenson | 475/5 |
| 6,638,193 B1 * | 10/2003 | Hamai | 475/5 |
| 6,951,521 B1 * | 10/2005 | Hakui | 475/150 |
| 2002/0094899 A1 * | 7/2002 | Hamai | 475/5 |
| 2004/0188216 A1 * | 9/2004 | Yamazaki | 192/84.6 |
| 2005/0205377 A1 * | 9/2005 | Borgerson et al. | 192/48.3 |

* cited by examiner

*Primary Examiner*—Tisha Lewis
(74) *Attorney, Agent, or Firm*—Christopher DeVries

(57) ABSTRACT

A torque-transmitting mechanism has an electric motor apply apparatus. The electric motor is operable to control a drag torque on a rotatable plate for a torque-to-thrust apparatus. The control of the rotatable plate by the electric motor and drag torque results in a thrust force being applied to the torque-transmitting mechanism such that the torque-transmitting mechanism is conditioned to transmit torque between two members of a power transmission.

5 Claims, 2 Drawing Sheets

ELECTRIC MOTOR APPLIED CLUTCH WITH A DRAG TORQUE ACTUATOR

TECHNICAL FIELD

This invention relates to torque-transmitting device actuators and, more particularly, to electric motor applied actuators.

BACKGROUND OF THE INVENTION

Torque-transmitting devices, such as rotating clutches and stationary clutches or brakes, are historically applied with fluid actuated mechanisms, such as axially movable pistons. More recently, it has been suggested that the torque-transmitting mechanisms might be applied with torque-to-thrust apparatus, which are actuated by an electric motor. The electric motor applies the torque to the torque-to-thrust apparatus and a cam structure interface converts the input torque to an axial thrust, which is applied to a torque-transmitting friction mechanism to thereby apply the mechanism to provide either a rotating drive connection or a stationary torque-to-ground connection. The electric motor therefore is required to have sufficient torque capacity to initiate the torque-to-thrust application through the torque-to-thrust apparatus.

SUMMARY OF THE INVENTION

It is an object of the present invention to provide an improved electric motor applied drag torque actuated clutch mechanisms.

In one aspect of the present invention, an electric motor is operable to establish a drag torque on the input side of a torque-to-thrust apparatus.

In another aspect of the present invention, a portion of the drag torque apparatus is connected with a stationary transmission mechanism.

In still another aspect of the present invention, the electric motor applied torque-to-thrust apparatus includes a mechanical latching mechanism to maintain engagement of the torque-transmitting mechanism controlled by the torque-to-thrust apparatus.

In yet another aspect of the present invention, the electric motor actuated torque-to-thrust apparatus is operable to provide an output thrust regardless of the direction of rotation of the torque input side of the torque-to-thrust apparatus.

DESCRIPTION OF AN EXEMPLARY EMBODIMENT

Figure 1:
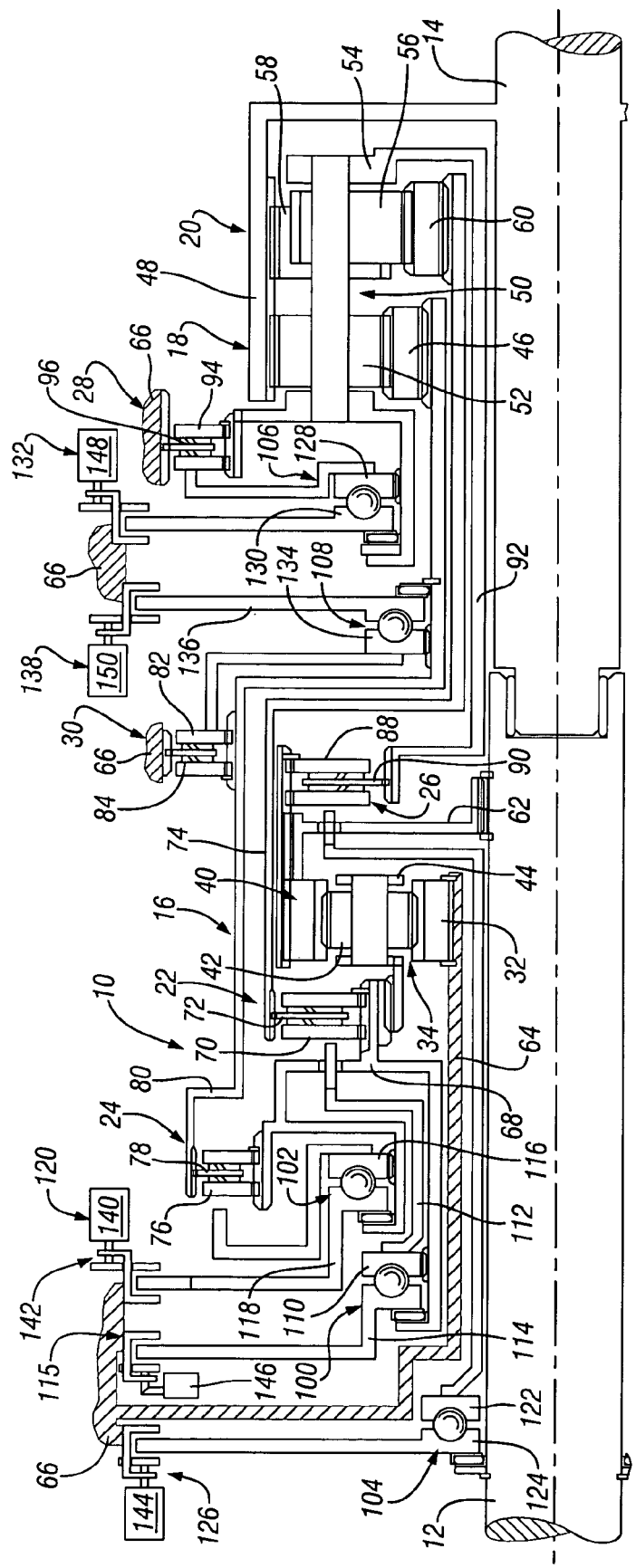
FIG. 1 is a schematic representation of a portion of a transmission mechanism incorporating the present invention.

Referring to the drawings, wherein like characters represent the same or corresponding parts throughout the several views, there is seen in FIG. 1 a power transmission generally designated 10 having an input shaft 12, an output shaft 14, three planetary gearsets 16, 18, and 20, and five torque-transmitting mechanisms 22, 24, 26, 28, and 30. The torque-transmitting mechanisms 22, 24, and 26 are rotating type torque-transmitting mechanisms or clutches, and the torque-transmitting mechanisms 28 and 30 are stationary type torque-transmitting mechanisms, commonly termed stationary clutches or brakes.

The planetary gearset 16 includes a sun gear member 32, a planetary assembly member 34, and a ring gear member 40. The planetary assembly member 34 includes a plurality of pinion gears 42 rotatably mounted on a planet carrier member 44 and disposed in meshing relationship with the sun gear member 32 and the ring gear member 40.

The planetary gearset 18 includes a sun gear member 46, a ring gear member 48, and a planetary assembly member 50. The planetary assembly member 50 includes a plurality of pinion gears 52 rotatably mounted on a planet carrier member 54 disposed in meshing relationship with the sun gear member 46 and the ring gear member 48. The planetary assembly member 50 also includes a plurality of meshing pinion gears 56 and 58 rotatably mounted on the planetary carrier assembly member 50 and meshing respectively with a sun gear member 60 and the ring gear member 48. The sun gear member 60, ring gear member 48, and pinion gears 56 and 58 are members of the planetary gearset 20.

The input shaft 12 is continuously drivingly connected to a hub 62 with the ring gear member 40, the sun gear member 32 is continuously connected through a shaft and hub 64 to a portion of a transmission housing 66. Thus, the sun gear member 32 is continuously stationary and the ring gear member 40 is continuously rotating with the input shaft 12. The planet carrier member 54 is connected through a hub 68 with the torque-transmitting mechanism 22 and the torque-transmitting mechanism 24.

The torque-transmitting mechanism 22 includes a plurality of friction plates 70 drivingly connected with the hub 68 and a plurality of friction plates 72 drivingly connected with a hub 74. The torque-transmitting mechanism 24 includes a plurality of plates 76 drivingly connected with the hub 68 and a plurality of plates 78 drivingly connected with a hub 80. While the diagrammatic representation shows a single plate at 72 and 78, those skilled in the art will recognize that a plurality of interdigitated plates are generally employed in a torque-transmitting friction device, such as a clutch. The hub 80 is drivingly connected with the sun gear member 46 and the hub 74 is drivingly connected with the sun gear member 60.

The torque-transmitting mechanism 30 includes a plurality of plates 82 drivingly connected with the hub 80 and plates 84 drivingly connected with the transmission housing 66. The hub 62 is also drivingly connected with friction plates 88, which are components of the torque-transmitting mechanism 26. The torque-transmitting mechanism 26 also includes friction plates 90, which are drivingly connected with a hub 92, which in turn is drivingly connected with the planet carrier member 54. The torque-transmitting mechanism 28 includes friction plates 94, which are drivingly connected with the planet carrier member 54 and friction plates 96, which are drivingly connected with the transmission housing 66.

The torque-transmitting mechanism 22 is controlled in actuation by a torque-to-thrust apparatus 100, the torque-transmitting mechanism 24 is controlled in actuation by a torque-to-thrust apparatus 102, the torque-transmitting mechanism 26 is controlled in actuation by a torque-tothrust apparatus 104, the torque-transmitting mechanism 28 is controlled in actuation by a torque-to-thrust apparatus 106, and the torque-transmitting mechanism 30 is controlled in actuation by a torque-to-thrust apparatus 108.

As is well known, torque-to-thrust apparatus have a cam mechanism, which converts a small amount of torque to a large thrust force through controlled rotation of the rotating member. The torque-to-thrust apparatus 100 has a thrust plate 110, which is operable to axially move an apply piston 112. The torque-to-thrust apparatus 100 also has a rotary component 114, which is operatively connected with an electric motor actuator 115.

The torque-to-thrust apparatus 102 has a thrust plate 116, which is operable to apply a thrust or apply force to the plates 76 and 78 and a rotary plate 118, which is controlled by an electric motor actuator 120. The torque-to-thrust apparatus 104 has a thrust plate 122 and a rotating plate 124. The thrust plate 122 applies an actuating force to the friction plates 88 and 90 and the rotating plate 124 is controlled by an electric motor apply mechanism 126. The torque-to-thrust apparatus 106 has a thrust plate 128, which applies a force to the friction plates 94 and 96, a rotating plate 130, which is controlled by an electric motor actuator 132. The torque-to-thrust apparatus 108 has a thrust member 134, a rotating member 136, and an electric motor apply mechanism 138. The thrust member 134 is operable to actuate the torque-transmitting mechanism 30.

The electric motor actuator 120 includes an electric motor 140 having a drive mechanism 142, which is operable to establish a drag torque load on the rotating plate 118 of the torque-to-thrust apparatus 102. The electric motor apply mechanism 126 includes an electric motor 144, which is operable to apply a drag torque to the rotating plate 124 of the torque-to-thrust apparatus 104.

The electric motor actuator 115 includes an electric motor 146, which applies a drag torque to the rotary component 114 of the torque-to-thrust apparatus 100. The electric motor actuator 132 includes an electric motor 148, which is operable to apply drag torque to the rotating plate 130 of the torque-to-thrust apparatus 106. The electric motor apply mechanism 138 includes an electric motor 150, which is operable to apply a drag torque to the rotating member 136 of the torque-to-thrust apparatus 108.

The drag torque of each of the electric motors is applied through a small friction device, one side of which is grounded to the housing 66 and the other side includes a movable friction plate, which is engageable with their respective rotating members of the torque-to-thrust apparatus. As the drag torque is applied, for example, at electric motor actuator 120, the rotating plate 118 will decrease in speed thereby causing relative rotation between the rotating plate 118 and the thrust plate 116. As this relative rotation occurs, the cam mechanism associated with the torque-to-thrust apparatus 102 will cause linear movement of the thrust plate 116, which in turn will engage the torque-transmitting mechanism 24. The drag torque apparatus requires only a small amount of torque to initiate the relative rotation between the plates 118 and 116 and results in a large thrust force at the plate 116. Each of the electric motor actuating mechanisms operates in the same manner. The electric motor remains energized to maintain the small amount of drag torque for the actuation of the torque-transmitting mechanisms.

The torque-to-thrust apparatus 106 and 108 are two-way thrust apparatus. That is, the transmission mechanisms that each of the torque-to-thrust apparatus 106 and 108 are associated with can rotate in either direction during transmission operation. Therefore, the torque-transmitting mechanisms 28 and 30, respectively, must be controlled by torque-to-thrust apparatus, which is capable of functioning regardless of the direction of input rotation.

Figure 2:
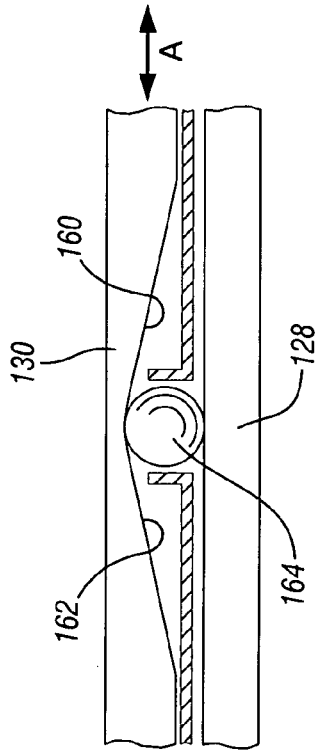
FIG. 2 is a diagrammatic representation of a portion of a torque-to-thrust apparatus incorporating the present invention.

A two-way rotary apparatus for a torque-to-thrust apparatus is shown in FIG. 2. In FIG. 2, the rotating plate 130 has two cam surfaces 160 and 162. The cam surfaces 160 and 162 are separated from the thrust plate 128 by a plurality of rollers 164, only one of which is shown in FIG. 2. The rotating plate 130 can be moved in the direction of Arrow A depending upon the rotation of the planet carrier member 54 to which the torque-to-thrust apparatus 106 is connected.

If the rotating plate 130 is moved to the right, as shown by Arrow A, the cam surface 162 will operate along with the roller 164 to create a thrust at the plate 128 thereby engaging the torque-transmitting mechanism 28. If the rotating plate 130 is moved to the left in the direction of Arrow A, the cam surface 160 will cause the rollers 164 to produce a thrust at the plate 128 thereby engaging the torque-transmitting mechanism 28. Thus, either direction of input rotation is accommodated by the torque-to-thrust apparatus 106.

The sun gear member 46, which is held stationary by the torque-transmitting mechanism 30, is also subject to either direction of rotation depending upon the direction required within the planetary gearset. Therefore, the torque-to-thrust apparatus 108 also incorporates a two-way rotary input plate similar to that described for FIG. 2.

Figure 3:
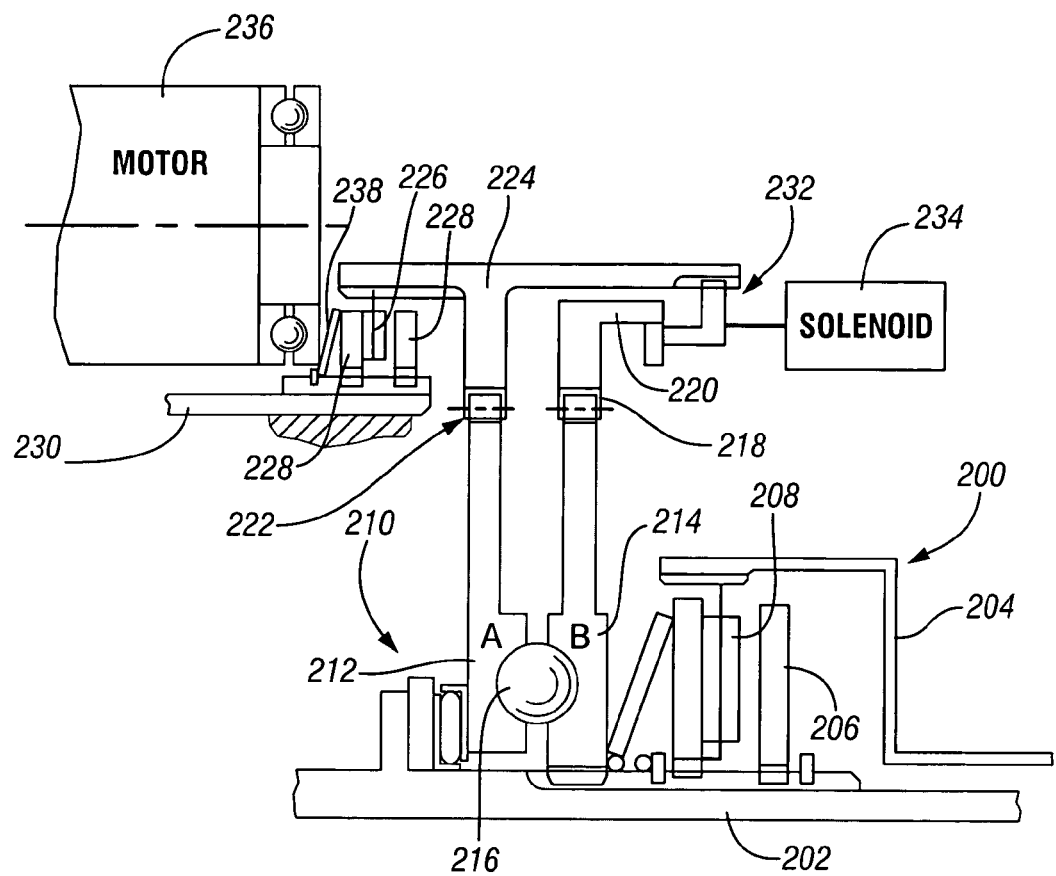
FIG. 3 is a diagrammatic representation of a rotating type torque-transmitting mechanism having a torque-to-thrust electric motor operated engagement mechanism and a mechanical latching mechanism.

A torque-transmitting mechanism 200, shown in FIG. 3, includes an input rotary shaft 202, an output hub 204, a plurality of friction plates 206 drivingly connected with the input rotary shaft 202, and a plurality of friction plates 208 connected with the hub 204. The torque-transmitting mechanism 200 is actuated by a torque-to-thrust apparatus 210, which includes a rotary plate 212, a thrust plate 214, and a plurality of rollers 216 disposed between the plates 212 and 214.

The thrust plate 214 rotates with the input shaft 202 and the plate 212 rotates in unison therewith provided a restraining force is not applied thereto. The plate 214 is drivingly connected through gear teeth 218 with a hub 220 and the plate 212 is drivingly connected through gear teeth 222 with a hub 224. The hub 224 is drivingly connected with a friction plate 226, which is disposed between friction plates 228, which are splined to a stationary housing 230. The hub 214 is also connected with a conventional dog clutch 232, which is controlled in an on/off condition by a conventional solenoid 234. When the dog clutch 232 is energized by the solenoid 234, the resulting engagement will cause the hub 224 to be connected with the hub 220, thereby interconnecting both sides of the torque-to-thrust apparatus 210.

The friction plates 228 and 226 are brought into contact through an electric motor 236, which operates to provide axial movement of an apply spring 238 to enforce axial movement of the plates 228 to thereby provide a friction engagement between the housing 230 and the hub 224. When the hub 224 is engaged through the drive friction of the plates 228 and 226 with the housing 230, the plate 212 will begin to rotate relative to the plate 214 such that the rollers 216 will cause a thrust force to be applied to the plate 214, thereby enforcing engagement of the friction plates 206 and 208 resulting in torque transmission through the torque-transmitting mechanism 200 between input 202 and the output 204.

When the torque-transmitting mechanism 200 is fully engaged, the solenoid 234 is actuated, thereby interconnecting both sides of the torque-to-thrust apparatus 210 such that operation of the electric motor 236 is no longer needed and the motor operation may be discontinued. When it is desired to disengage the torque-transmitting mechanism 200, the electric motor 236 is again operated to apply the drag torque to the plate 212 while the dog clutch 232 is disengaged and then the electric motor 236 is operated to disengage the drag torque between the plates 228 and 226, thus permitting disengagement of the torque-transmitting mechanism 200.

The invention claimed is:

1. An electric motor applied drag torque actuated torque-transmitting mechanism comprising:
    a first torque-transmitting mechanism having an apply piston;
    a first torque-to-thrust apparatus operatively connected with said apply piston to provide a thrust force for actuation of the torque-transmitting mechanism including an input member and an output member, and
    an electric motor actuator including a second torque-transmitting mechanism for applying a drag torque to control the rotation of a first member of the first torque-to-thrust apparatus through the application of said drag torque thereto resulting in relative rotation between the members of the torque-to-thrust apparatus, which thereby provides a thrust apply force to said first torque-transmitting mechanism to enforce engagement thereof.

2. The electric motor applied drag torque actuated torque-transmitting mechanism defined in claim 1 further comprising:
    said second torque-transmitting mechanism being disposed between a stationary member and said first member of said first torque-transmitting mechanism;
    said torque to thrust apparatus having a rotatable input side including said first member and a linearly moveable output side; and
    means for interconnecting said input member and said output member to inhibit disengagement operation of said torque to thrust apparatus and thereby retain said torque-transmitting mechanism engaged.

3. The electric motor applied drag torque actuated torque-transmitting mechanism defined in claim 2 further comprising:
    said electric motor actuator operation being discontinued subsequent to application of said interconnecting means.

4. The electric motor applied drag torque actuated torque-transmitting mechanism defined in claim 3 further wherein:
    said electric motor actuator being energized prior to release of said interconnecting means.

5. An electric motor applied drag torque actuated torque-transmitting mechanism comprising:
    a first torque-transmitting mechanism having an apply piston;
    a torque-to-thrust apparatus having input and output members operatively connected with said apply piston to provide a thrust force for actuation of the torque-transmitting mechanism;
    an electric motor actuator to control the rotation of a member of the torque-to-thrust apparatus through the application of a second torque-transmitting mechanism to apply a drag torque thereto to retard a speed of an input member of said torque to thrust apparatus resulting in relative rotation between the input and output members of the first torque-to-thrust apparatus, which thereby provides a thrust apply force to said torque-transmitting mechanism to enforce engagement thereof and said thrust apply force being independent of said friction drive drag torque; and
    means for retaining said torque to thrust apparatus in an operative condition after engagement of said torque-transmitting mechanism.

* * * * *